United States Patent
Barajas Gonzalez et al.

(10) Patent No.: US 10,798,167 B2
(45) Date of Patent: Oct. 6, 2020

(54) STORAGE ENHANCED INTELLIGENT PRE-SEEDING OF INFORMATION

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Harry McGregor, Tucson, AZ (US); Christopher B. Moore, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 14/952,109

(22) Filed: Nov. 25, 2015

(65) Prior Publication Data

US 2017/0149891 A1    May 25, 2017

(51) Int. Cl.
 *H04L 29/08* (2006.01)
 *H04L 12/26* (2006.01)
 *H04L 12/911* (2013.01)

(52) U.S. Cl.
 CPC ...... *H04L 67/1097* (2013.01); *H04L 43/0876* (2013.01); *H04L 43/0888* (2013.01); *H04L 47/823* (2013.01); *H04L 67/289* (2013.01); *H04L 67/2847* (2013.01); *H04L 67/303* (2013.01)

(58) Field of Classification Search
 CPC .................................................. H04L 67/2847
 See application file for complete search history.

(56) References Cited

U.S. PATENT DOCUMENTS

| | | | | |
|---|---|---|---|---|
| 7,451,225 B1 * | 11/2008 | Todd | .................. | G06F 12/0862 709/229 |
| 8,209,291 B1 * | 6/2012 | Ma | ..................... | H04L 67/2847 707/641 |
| 8,762,570 B2 | 6/2014 | Qian et al. | | |
| 8,959,162 B2 | 2/2015 | Bhogal et al. | | |
| 9,043,530 B1 * | 5/2015 | Sundaram | .............. | G06F 3/068 711/100 |
| 9,294,553 B1 * | 3/2016 | Vaswani | ................ | H04L 67/10 |

(Continued)

FOREIGN PATENT DOCUMENTS

WO    2013004268 A1    1/2013

OTHER PUBLICATIONS

Sarolahti et al., "Content-and Cache-Aware TCP: Delegating Transfers to the Net" 12 pages, Technical Report, updated Jun. 2012.

(Continued)

*Primary Examiner* — Andrew C Georgandellis
(74) *Attorney, Agent, or Firm* — Griffiths & Seaton PLLC

(57) ABSTRACT

Various embodiments for data management across a network by a processor. Data characteristics are analyzed through the network, incorporating an analysis of traffic and utilization of the data in the network, and inclusive of data operations resulting in at least a portion of the data reaching an endpoint in a network topology. Based on the analysis of the data characteristics, the portion of the data is pre-seeded forward to a location closer to the endpoint in the network topology than a previously stored location, such that when the portion of the data is requested through the endpoint, movement of the portion of the data to the endpoint encumbers fewer resources of the network.

6 Claims, 5 Drawing Sheets

(56) References Cited

U.S. PATENT DOCUMENTS

| | | | |
|---|---|---|---|
| 2006/0277308 A1* | 12/2006 | Morse | G06F 17/30867 709/227 |
| 2009/0113412 A1* | 4/2009 | Shribman | G06F 17/30067 717/170 |
| 2010/0174735 A1* | 7/2010 | Fiatal | G06F 17/30106 707/769 |
| 2011/0264865 A1* | 10/2011 | Mobarak | G06F 12/121 711/141 |
| 2012/0297088 A1 | 11/2012 | Wang et al. | |
| 2013/0238762 A1* | 9/2013 | Raleigh | H04L 67/306 709/219 |
| 2014/0115574 A1* | 4/2014 | Valentine | H04L 67/34 717/172 |
| 2014/0173018 A1 | 6/2014 | Westphal et al. | |
| 2015/0281390 A1* | 10/2015 | Kovvuri | H04L 67/2842 709/203 |
| 2016/0226992 A1* | 8/2016 | Akcin | H04L 67/2842 |

OTHER PUBLICATIONS

Katsaros et al., "MultiCache: An Overlay Architecture for Information-Centric Networking" pp. 936-947, Computer Networks vol. 55, No. 4, 2011.

Dannewitz et al., "Network of Information (NetInf)—An Information-Centric Networking Architecture" pp. 721-735, Computer Communications 36, 2013.

Moreno et al., "Updaticator: Updating Billions of Devices by an Efficient, Scalable and Secure Software Update Distribution Over Untrusted Cache-enabled Networks" pp. 76-93, Computer Security-ESORICS 2014, Springer International Publishing, 2014.

* cited by examiner

STORAGE ENHANCED INTELLIGENT PRE-SEEDING OF INFORMATION

BACKGROUND OF THE INVENTION

Field of the Invention

The present invention relates in general computing systems, and more particularly to, various embodiments for data management across a network.

Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment.

SUMMARY OF THE INVENTION

Various embodiments for data management across a network by a processor are provided. In one embodiment, by way of example only, data characteristics are analyzed through the network, incorporating an analysis of traffic and utilization of the data in the network, and inclusive of data operations resulting in at least a portion of the data reaching an endpoint in a network topology. Based on the analysis of the data characteristics, the portion of the data is pre-seeded forward to a location closer to the endpoint in the network topology than a previously stored location, such that when the portion of the data is requested through the endpoint, movement of the portion of the data to the endpoint encumbers fewer resources of the network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
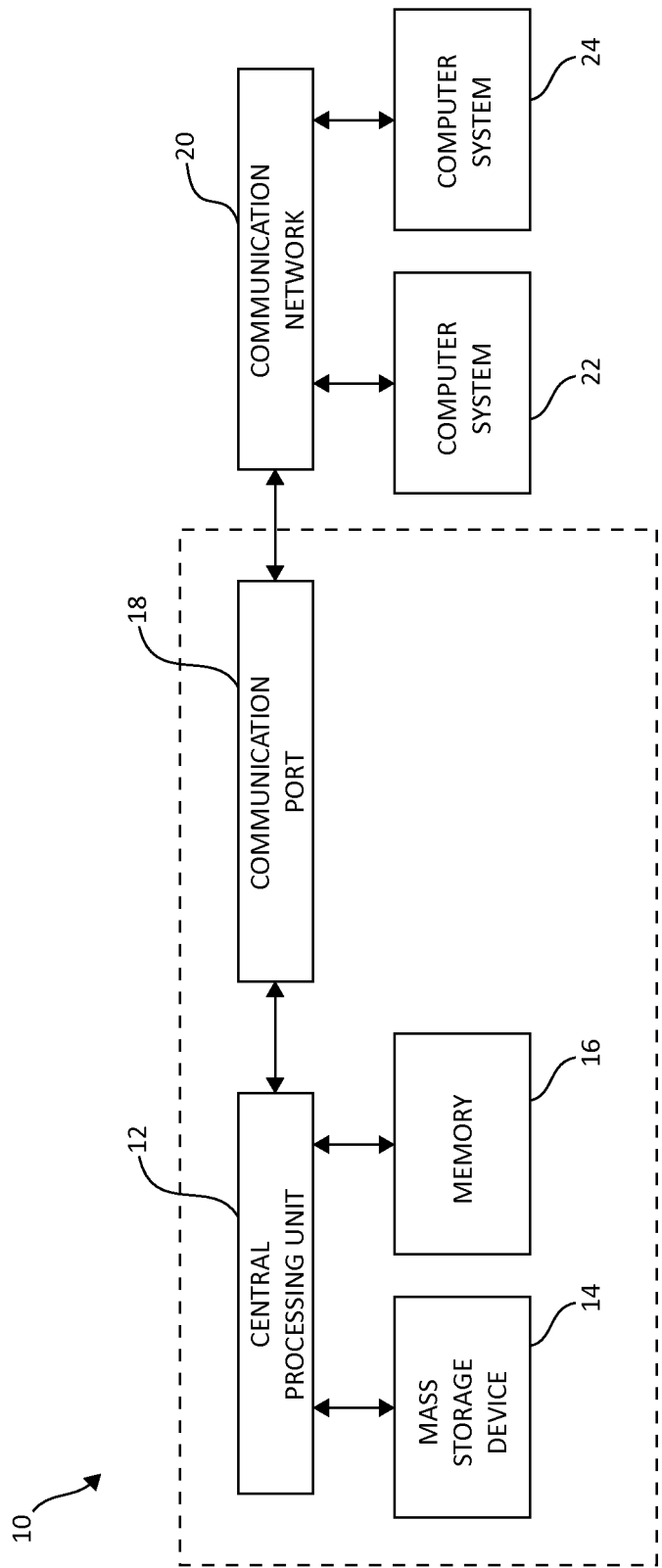
FIG. 1 is an exemplary block diagram showing a hardware structure for data management across a network, in which aspects of the present invention may be realized.

With the enormous capacity of the internet and the unbridled imagination of software developers, there is a remarkable consistency in the data that various users may access. For example, thousands, even hundreds of thousands, of different individuals may be found living in different places, working different jobs, living completely different lives, and moreover, having relatively nothing in common with each other. Yet these same individuals may, at least in some aspect, share the same data. For example, the individuals may all need to access a particular software update for a particular application.

Internet Service Providers (ISPs) may easily have millions of customers. A particular software patch (e.g., security patch for an operating system) may need to be made available to each of those customers that share the operating system on their computers. Accordingly, there is a high likelihood that each of those users will contact the update server for that software data in separate requests. In other words, many users will access the update server for the exact same file, repeated a large number of times.

With the necessity of each individual user to access the same file, comes the attendant necessity of the ISP to provide an individual Input/Output (I/O) "pipe" to that particular update server for each time the exact data file is requested by an individual. Each user must thereby wait for the particular download as the I/O hops between the user's location and the update server.

Currently, there is no mechanism available for providing the very data that this large number of users requires, typically in a very short timeframe, other than on an "on demand" basis. That is to say, when the user requests the data, the user is put into a queue in which the ISP connects the user with the location providing the data in a first-come, first-served basis. While technologies exists for reducing bandwidth utilization at the enterprise/service provider level, for example, there is still extensive pressure put on the "last mile" of the network to the user.

Accordingly, a need exists for a mechanism to better facilitate the delivery of known types of data, in all of the various forms and sizes, to users, and thereby minimize the encumbrance of resources along the network (e.g., storage resources, switching resources, processing resources, and the like).

In view of the foregoing, the various mechanisms of the illustrated embodiments introduce functionality designed to facilitate the rapid and efficient delivery of known data types in a repeated manner over a network, in part, for example, by pre-seeding the data forward from the update server location to a location closer to the network endpoint, as will be further described.

The mechanisms of the illustrated embodiments implement various functionality to achieve the foregoing by, for example, analyzing the characteristics of the data itself, characteristics of the network over which the data is being sent, who is requesting the data, where the data is being sent from, and so forth. The various aspects of the illustrated embodiments, then, also provide methodologies for analysis of both inbound and outbound network traffic, and the associated data. Based on the analysis, the various aspects determine, for example, the type of data, the amount of data, the time the data is to be delivered, and so forth, so as to minimize the disruption on the network as the selected data is pre-seeded forward. Once the applicable data has been identified and pre-seeded to a forward location, the mechanisms of the present invention then await a specific request from an individual for the data, and at which time the applicable data is then forwarded from the forward location through the network endpoint to the user, thus potentially considerably reducing network encumbrances and thereby reducing costs, while enhancing the performance of the network for the user's (and the provider's) benefit.

In one embodiment, the present invention pre-seeds the selected data forward to customer premises equipment (CPE). This may be a locally based storage location such as a location associated with a router, cable modem, DSL modem, or other network component that is proximally closer to an endpoint of a particular network, and closer to the end user. This pre-seeding may be accomplished, for example, by determining which operating systems (OS), major applications, games, devices, and other components are in the local network of the user, and capable (and may necessitate) the data to be selected and pre-seeded. In other words, the mechanisms of the illustrated embodiments anticipate data that may be requested by the user at the network endpoint, and intelligently forward the selected data to the pre-seeded location for access before the selected data is requested.

In one embodiment, the mechanisms of the illustrated embodiments utilize a higher-performance storage medium, such as flash memory and/or solid state storage connected in the user's local network to better facilitate the data transfer to the local location and user access. In this way, for example, the user's CPE can leverage the effectiveness of the pre-seeding functionality at a very local point of access for the end user networks. In this manner, in one example, the temporary storage may be physically located on the CPE device, while the analytics and data analysis provided by the mechanisms of the illustrated embodiments determines what should be pre-seeded on each individual CPE device that, also in one example, may be performed at the provider network layer using local or cloud-based computational resources.

In an alternative embodiment, multiple CPE devices (or other devices specifically put in place for the data analysis and/or pre-seeding purposes) may cross-communicate (for example, using the provider's existing resources) to provide enhanced data management capabilities for network segments. The pre-seeding of data may be performed during periods of lower provider network utilization, and controlled by the provider to ensure more balanced network usage.

The mechanisms of the illustrated embodiments may implement several aspects of functionality associated with the pre-seeding of data forward to a more proximate network location. A data collection function may perform several types of analysis. For example, as part of network traffic analysis, the mechanisms may identify/detect a user operating system, a user application (including games and other common applications), a user appliance, or user embedded device detection.

A network utilization analysis function, in another embodiment, may analyze inbound throughput tracking based on time to determine periods of low network utilization, and outbound throughput tracking based on time to determine periods of low local network utilization. Such analysis may be useful for the data pre-seeding functionality to operate during the most appropriate times. Similarly, a service provider data collection function may track inbound network throughput based on time to determine periods of low network segment utilization, and track outbound network throughput based on time to determine periods of low network segment utilization.

In a further embodiment, the present invention may implement various data analysis and seeding functionality, as previously described. For example, the mechanisms of the illustrated embodiment may identify operating systems and applications operational with a user's local environment (local network) using known network traffic signature analysis. Once information is determined, then the mechanisms may, for example, limit an applicable decision tree based on the OS and/or applications and/or devices detected within the local network/accessible to the user so as to avoid the use of unnecessary computational or network resources.

The mechanisms of the illustrated embodiments may assess and determine potential patches, updates, and other associated downloads commonly associated with the user's local environment. As one of ordinary skill in the art will appreciate, these kinds of data may vary greatly. For example, the data may include patches, releases, critical updates, definition updates, drivers and driver updates, feature packs, security updates, service packs, tools, other updates, and update rollups, among other data.

The mechanisms of the illustrate embodiments may, in one example, perform analytics on websites (such as vendor websites) to determine the level of urgency of a certain portion of data. These analytics may be performed using so-called "sentiment analysis" techniques, for example. If available, vendor pre-release information may be utilized regarding future update and available patches, for example. A variety of sources, known to one of ordinary skill in the art, may be consulted to ascertain as much information about pre-seed data candidates.

In one embodiment, local network utilization information maybe be analyzed to determine on a per-user basis an ideal and/or least intrusive period(s) of available time to perform data pre-seeding operations. As previously mentioned, the various types themselves of client devices (tablets, smartphones, computers, multimedia streaming equipment and/or set top boxes, and the like) may be tracked on the user's local network. In this way, the various network and data analysis functions may be able to utilize such information to select pre-seed candidates that are specifically tailored to the particular device of the user.

In addition to tracking specific user devices, the mechanisms of the illustrated embodiments may track the data that was pre-seeded to a particular user, such that a data aging and eviction policy maybe be implemented. For example, the mechanisms may determine (or receive notification) that an update for a particular application is to be made available, and may also know that the particular user device has previously downloaded that application or related updates. In this manner, the mechanisms are able to identify the new update as a pre-seed candidate, and also determine that the existing (outdated) application update that may currently reside in the pre-seeded forward location may be evicted. Other data aging/eviction programs may be implemented, where particular data is retained and later evicted in order of a determined importance, priority, or history. Here again, during periods of low network utilization, the mechanisms may take advantage of greater available system resources to perform the pre-seed functionality or data management programs, for example, as a background process.

Turning now to the Figures, and first to FIG. 1, exemplary architecture 10 of a computing system environment is depicted. Architecture 10 may, in one embodiment, be implemented at least as part of a system for effecting mechanisms of the present invention. The computer system 10 includes at least one central processing unit (CPU) 12, which is connected to communication port 18 and memory device 16. The communication port 18 is in communication with a communication network 20. The communication network 20 may be configured to be in communication with systems 22, 24 and architecture 10, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere, and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12. As one of ordinary skill in the art will appreciate, a number of systems 10 may be configured in a connected and/or distributed way, physically located together or across a long geographically connected network, for example.

Figure 2:
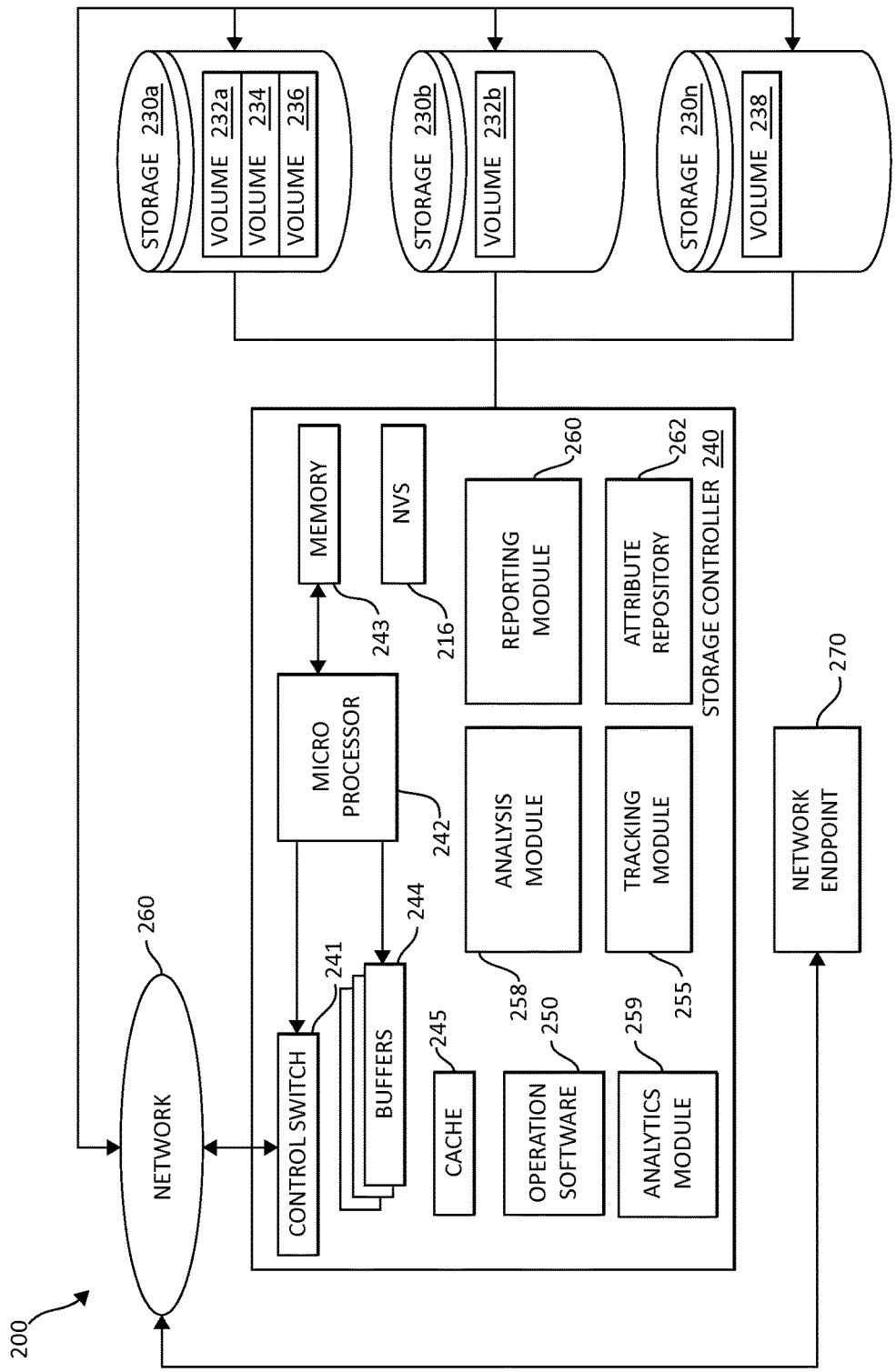
FIG. 2 is an exemplary block diagram showing a hardware structure of a data storage system in a networked computing storage environment, again in which aspects of the present invention may be realized.

FIG. 2 is an exemplary block diagram showing a hardware structure of a data management system 200 that may be used in the overall context of performing functionality according to various aspects of the present invention.

Network 260 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Network management system 200 is accordingly equipped with a suitable fabric (not shown in FIG. 2) or network adaptor 260 to communicate.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network 260 within data storage system 200.

In a local or remote location, yet connected over network 260, storage 230 (labeled as 230a, 230b, and 230n herein) may be comprised of one or more storage devices, such as storage arrays, which are connected to storage controller 240 (e.g., by a storage network) as shown.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 270 is connected through the network 260 as shown. The network endpoint 270 is generically intended to refer to any number of network devices, such as a switch, a router, a wireless access point, or another device known generally to one of ordinary skill in the art. In one embodiment, the network endpoint constitutes a wide variety of CPE as was previously described. As will be further illustrated in the following figures, a user may use a networked device, (e.g., a device connected to network 260) to access the network 260. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 260 is anticipated to use the network endpoint 270.

The storage controller 240 may include a tracking module 255, an analysis module 258, a reporting module 260 and and one or more attribute repositories 262 (e.g., tables) for various entries, among other functional components. The tracking module 255, analysis module 258, reporting module 260 and entries 262 may operate in conjunction with each and every component of the storage controller 240, and storage devices 230. The tracking module 255, analysis module 258, reporting module 260 and entries 262 may be structurally one complete module or may be associated and/or included with other individual modules. The tracking module 255, analysis module 258, reporting module 260 and entries 262 may also be located at least partially in the cache 245 or other components, as one of ordinary skill in the art will appreciate.

The tracking module 255, analysis module 258, reporting module 260 and entries 262 may individually and/or collectively perform various aspects of the present invention as will be further described. For example, the tracking module 255 may perform various tracking operations and related analytics in accordance with aspects of the illustrated embodiments. The analysis module 258 may also use analytics to identify, organize, create, delete or perform other actions on various patterns, trends, and other characteristics identified in the tracked data over the network. Reporting module 260 may notify various portions of the data storage system 200 about changes in the physical placement of the data (e.g., the data being moved), warn users about placement of data in a particular location, and so forth. Finally, each of the various characteristics of the network (and information from operations related to the network), may be stored, organized, retrieved, and deleted in the entries 262. As one of ordinary skill in the art will appreciate, the tracking module 255, analysis module 258, reporting module 260 and entries 262 may make up only a subset of various functional and/or functionally responsible entities in the data storage system 200.

Other ancillary hardware may be associated with the storage system 200. For example, as shown, the storage controller 240 includes a control switch 241, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the tracking module, analysis module 258, reporting module 260, attribute repositories 262, or other blocks of functionality, in which information may be set. Multiple buffers 244 may be implemented with the present invention to assist with the operations as described herein.

Figure 3:
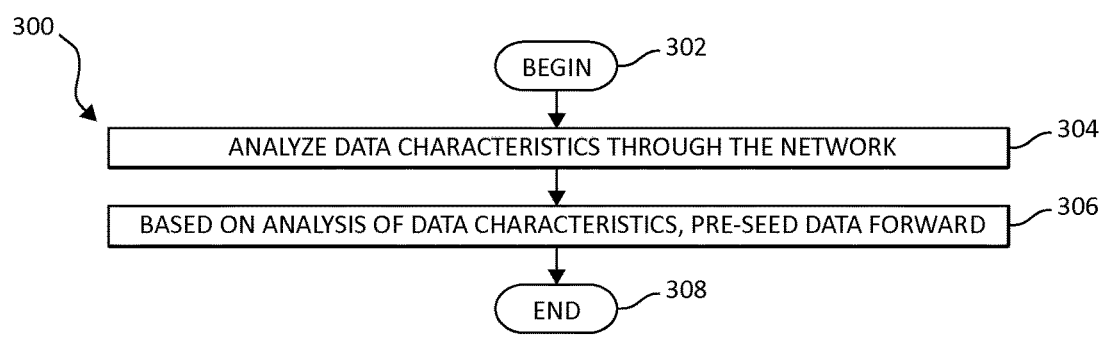
FIG. 3 is a flow chart diagram illustrating an exemplary method for data management across a network by a processor, in accordance with various aspects of the present invention.

Turning now to FIG. 3, a flow chart diagram, illustrating an exemplary method 300 for data management across a network, according to the present invention, is depicted. Method 300 begins (step 302). As a first step, an analysis of data characteristics, such as the aforementioned network input and output throughput characteristics, for example, is conducted (step 304).

Based on the analysis of the data characteristics through the network, selected data is then pre-seeded forward to a location closer to the identified network endpoint (step 306). The method 300 then ends (step 308).

Figure 4:
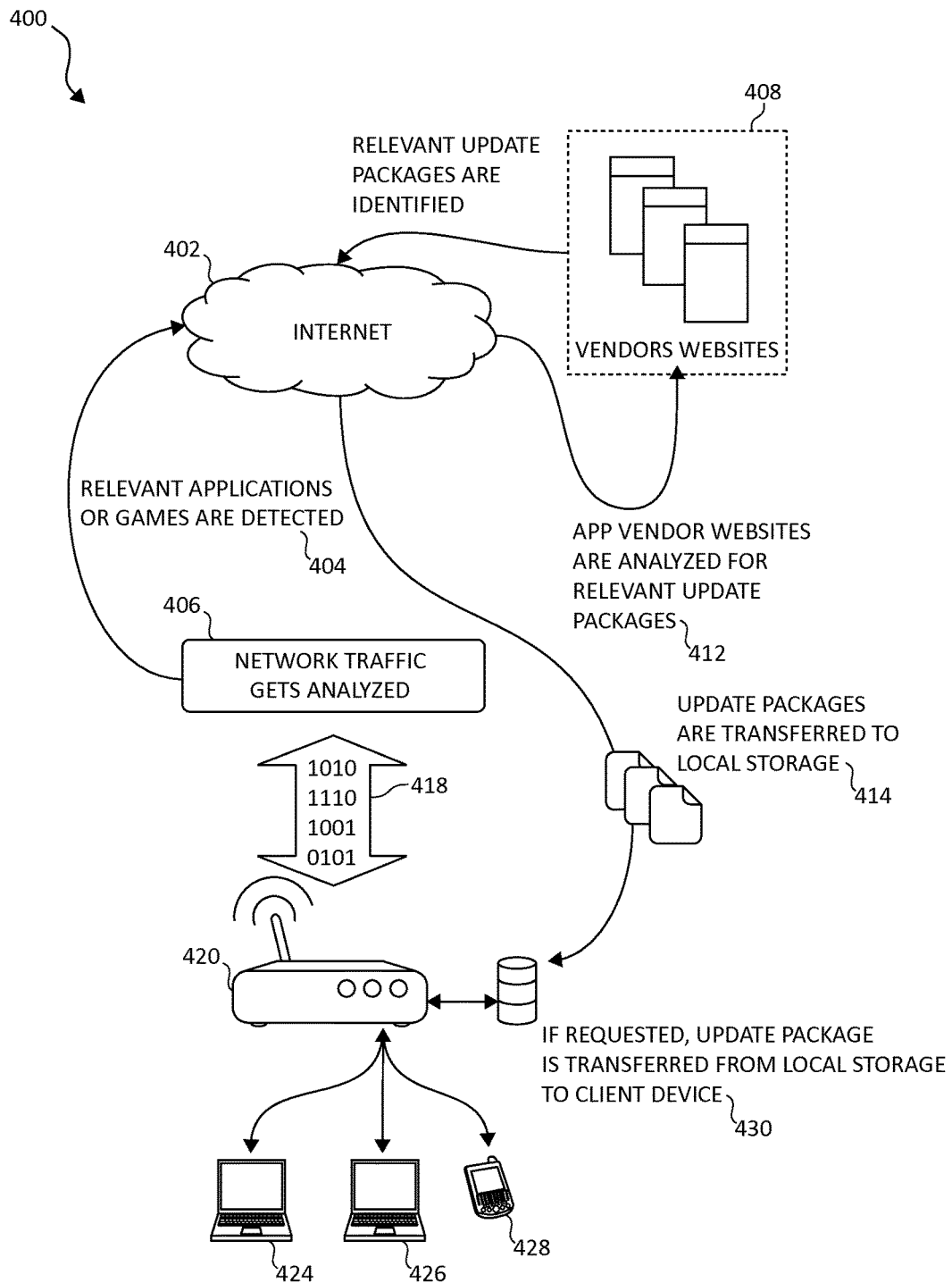
FIG. 4 is a block/flow diagram illustrating an exemplary method for data management across a network by a processor, again in which aspects of the present invention may be implemented.

Turning now to FIG. 4, an illustration 400 for various aspects of the present embodiments for pre-seeding data and other functionality in accordance with data management across a network is shown.

Illustration 400 depicts various mechanisms of the illustrated embodiments using real-world examples. Internet 402 is shown representative of the enormity of the World-Wide Web (WWW), which then becomes a portion of the "network" in which data is selected to be pre-seeded forward. As one of ordinary skill in the art will appreciate, the Internet 402 becomes an ultimate source for information from a user, be it games, news, cloud-based applications or storage, software, entertainment, and other information.

In one embodiment, the ISP (provider) analyzes the network traffic (406), and relevant applications, games, software updates, etc., are detected (404). The entity responsible for analyzing the network traffic, according to the various mechanisms of the present invention, may also be in communication through the Internet 402 with various vendor websites 408, where relevant update packages, for example, are identified. A variety of analysis as previously described may take place, according to various aspects of the present invention. In a depicted example, the vendor websites are analyzed for relevant update packages (412).

The relevant information is delivered from the Internet 402 through wide area networks (WANs) and local area networks (LANs), (418), culminating upon receipt and transmittal in network endpoint 420, which in the depicted embodiment, may be a network appliance (router, wireless access point, etc.), or any CPE equipment connected to the overall network. In addition, storage location 422 is shown in communication with the endpoint 420, in a geographic location in the user's LAN that is in closer proximity than, for example, the vendor's storage server.

In the depicted embodiment, the identified relevant update packages are then transferred (pre-seeded) through the various network paths to the network endpoint 420 and the connected local storage 422. Once the data has been transferred to the storage 422, if requested by a user client device 424, 426, 428 through the network endpoint 420, the update package information may then be transferred from the local storage 422 to the client device 424, 426, and 428 as appropriate.

Figure 5:
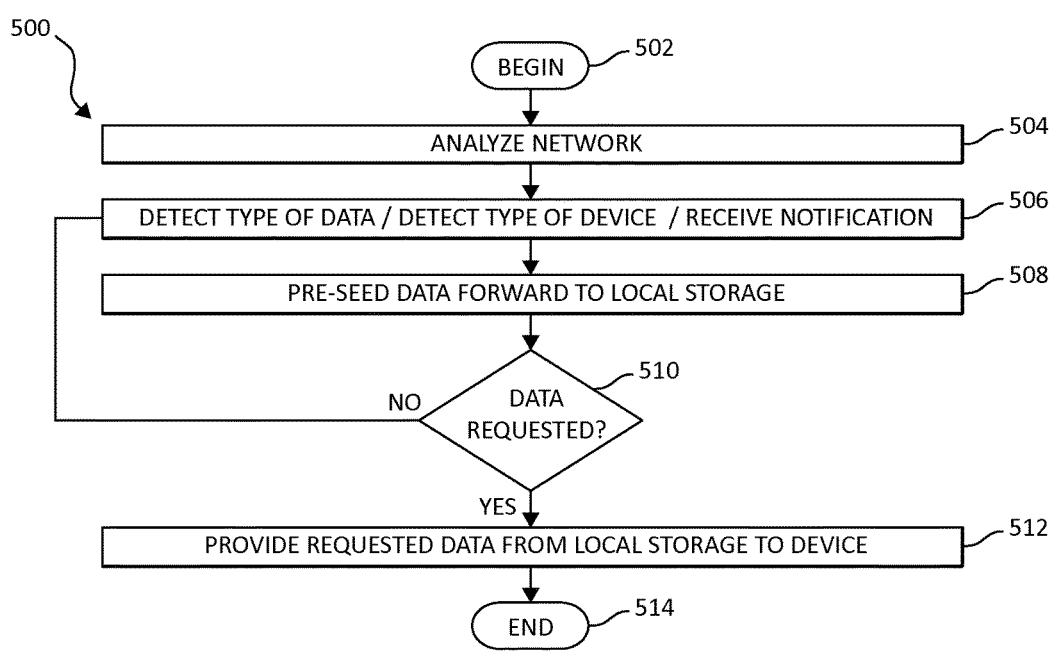
FIG. 5 is a flow chart diagram illustrating an additional exemplary method for data management across a network by a processor, again in which various aspects of the present invention may be implemented.

Turning now to FIG. 5, an exemplary method 500 for data management through a network by a processor, in which aspects of the present invention may be implemented, is depicted. Method 500 begins (step 502) with various analysis processes of data/data through the network (step 504) by a provider, or other entity charged with data management.

In subsequent step 506, the provider receives notification from, or as a result of the various analysis processes, determines a type of data candidate to be pre-seeded (update, multimedia information, etc.), and also determines an eligible type of client device in which the pre-seeded data will be received. As previously described, these determinations may come about from a variety of methodologies, such as analysis of vendor websites, actual notifications from data owners, an analysis of previous data traveling over the network, and so on.

Once the appropriate pre-seed data candidate has been identified, the data is pre-seeded forward to the local storage (step 508). The method 500 moves to step 510, which queries whether the pre-seeded data has been requested. If no, the method 500 returns to step 506 as previously described.

If the pre-seeded data is requested, the client device receives the data from the pre-seeded storage location closer in proximity to the network endpoint, in step 512. As previously described, the client device is provided, in one embodiment, the pre-seed data from the forward location through the network endpoint to the device. By providing the local pre-seed data to the client device rather than through an additional pipe through the provider's entire network, both provider and client experience greater network performance resulting from fewer network resources being encumbered by the transfer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for data management across a network, the method comprising:
    performing, by an internet service provider (ISP), a network traffic signature analysis on outbound traffic sent from a client device via a local area network to which the client device is connected;
    determining, by the ISP, a type of the client device, an operating system of the client device, and an application installed on the client device based on the network traffic signature analysis;
    determining, by the ISP, a first application-critical or hardware-critical update that is appropriate for the client device based only on the type of the client device, the operating system of the client device, and the application installed on the client device;
    determining, by the ISP, a time period of low utilization of the local area network by tracking a throughput of outbound traffic sent from the local area network;
    pre-seeding, by the ISP, the first application-critical or hardware critical update to a customer premises equipment (CPE) during the time period of low utilization, wherein the CPE comprises a router or modem that connects the local area network to a wide area network;
    storing, by the CPE, the first application-critical or hardware-critical update in a storage location associated with the CPE;
    pre-seeding, by the ISP, a second application-critical or hardware-critical update to the CPE and storing the second application-critical or hardware-critical update in the storage location associated with the CPE; and
    evicting, by the CPE, the first application-critical or hardware critical update from the storage location associated with the CPE upon determining that the first application-critical or hardware critical update is an outdated version of the second application-critical or hardware-critical update.

2. The method of claim 1, further including the ISP identifying types of data to be pre-seeded, including at least one of a patch, a release, a critical update, a definition update, a driver, a feature pack, a security update, a service pack, a tool, an update, and an update rollup.

3. A system for data management across a network, the system comprising an internet service provider (ISP) and a customer premises equipment (CPE) respectively configured to:
    perform, by the ISP, a network traffic signature analysis on outbound traffic sent from a client device via a local area network to which the client device is connected;
    determine, by the ISP, a type of the client device, an operating system of the client device, and an application installed on the client device based on the network traffic signature analysis;
    determine, by the ISP, a first application-critical or hardware-critical update that is appropriate for the client device based only on the type of the client device, the operating system of the client device, and the application installed on the client device;
    determine, by the ISP, a time period of low utilization of the local area network by tracking a throughput of outbound traffic sent from the local area network;
    pre-seed, by the ISP, the first application-critical or hardware critical update to the CPE during the time period of low utilization, wherein the CPE comprises a router or modem that connects the local area network to a wide area network;
    store, by the CPE, the first application-critical or hardware-critical update in a storage location associated with the CPE;
    pre-seed, by the ISP, a second application-critical or hardware-critical update to the CPE and storing the second application-critical or hardware-critical update in the storage location associated with the CPE; and
    evict, by the CPE, the first application-critical or hardware critical update from the storage location associated with the CPE upon determining that the first application-critical or hardware critical update is an outdated version of the second application-critical or hardware-critical update.

4. The system of claim 3, wherein the ISP identifies types of data to be pre-seeded, including at least one of a patch, a release, a critical update, a definition update, a driver, a feature pack, a security update, a service pack, a tool, an update, and an update rollup.

5. A computer program product for data management across a network by a processor, the computer program product comprising a non-transitory computer-readable storage medium having computer-readable program code portions stored therein, the computer-readable program code portions comprising an internet service provider (ISP) portion and a customer premises equipment (CPE) portion which, when respectively executed by an ISP and a CPE, cause the ISP and CPE to:
    perform, by the ISP, a network traffic signature analysis on outbound traffic sent from a client device via a local area network to which the client device is connected;
    determine, by the ISP, a type of the client device, an operating system of the client device, and an application installed on the client device based on the network traffic signature analysis;
    determine, by the ISP, a first application-critical or hardware-critical update that is appropriate for the client device based only on the type of the client device, the operating system of the client device, and the application installed on the client device;
    determine, by the ISP, a time period of low utilization of the local area network by tracking a throughput of outbound traffic sent from the local area network;
    pre-seed, by the ISP, the first application-critical or hardware critical update the CPE during the time period of low utilization, wherein the CPE comprises a router or modem that connects the local area network to a wide area network;
    store, by the CPE, the first application-critical or hardware-critical update in a storage location associated with the CPE;

pre-seed, by the ISP, a second application-critical or hardware-critical update to the CPE and storing the second application-critical or hardware-critical update in the storage location associated with the CPE; and evict, by the CPE, the first application-critical or hardware critical update from the storage location associated with the CPE upon determining that the first application-critical or hardware critical update is an outdated version of the second application-critical or hardware-critical update.

6. The computer program product of claim 5, wherein the ISP portion causes the ISP to identify types of data to be pre-seeded, including at least one of a patch, a release, a critical update, a definition update, a driver, a feature pack, a security update, a service pack, a tool an update, and an update rollup.

* * * * *